(12) United States Patent
Kim et al.

(10) Patent No.: US 10,386,943 B2
(45) Date of Patent: Aug. 20, 2019

(54) ELECTRONIC DEVICE COMPRISING ROTATING BODY AND CONTROL METHOD THEREFOR

(71) Applicant: Samsung Electronics Co., Ltd., Suwon-si, Gyeonggi-do (KR)

(72) Inventors: Yongyi Kim, Suwon-si (KR); Junhui Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/541,194

(22) PCT Filed: Dec. 28, 2015

(86) PCT No.: PCT/KR2015/014327
§ 371 (c)(1),
(2) Date: Jun. 30, 2017

(87) PCT Pub. No.: WO2016/108537
PCT Pub. Date: Jul. 7, 2016

(65) Prior Publication Data
US 2017/0371431 A1    Dec. 28, 2017

(30) Foreign Application Priority Data

Jan. 2, 2015  (KR) .................. 10-2015-0000118

(51) Int. Cl.
*G06F 3/0346*    (2013.01)
*H04W 4/00*    (2018.01)
(Continued)

(52) U.S. Cl.
CPC .......... *G06F 3/0362* (2013.01); *G04C 3/001* (2013.01); *G04G 17/08* (2013.01); *G04G 21/02* (2013.01);
(Continued)

(58) Field of Classification Search
None
See application file for complete search history.

(56) References Cited

U.S. PATENT DOCUMENTS

| | | | |
|---|---|---|---|
| 6,556,222 B1 | 4/2003 | Narayanaswami | |
| 2003/0070106 A1* | 4/2003 | Kosuda | G06F 1/06 713/500 |

(Continued)

FOREIGN PATENT DOCUMENTS

| | | |
|---|---|---|
| JP | 2006-014947 A | 1/2006 |
| JP | 2009-281803 A | 12/2009 |
| WO | 2013062961 A1 | 5/2013 |

OTHER PUBLICATIONS

European Office Action dated Dec. 6, 2018 in EP Application No. 15875631.2.

(Continued)

*Primary Examiner* — Carl Adams
(74) *Attorney, Agent, or Firm* — Jefferson IP Law, LLP

(57) ABSTRACT

According to various embodiments, provided are an electronic device and a control method therefor, the electronic device comprising: a main body comprising at least one electronic component; a rotating body rotatably provided in a manner such that the rotating body encompasses at least a part of a region of the main body; a rotation detection means for detecting a rotation parameter of the rotating body; and at least one processor for performing a corresponding function of the electronic device on the basis of the detected rotation parameter.

14 Claims, 19 Drawing Sheets

(51) Int. Cl.
    *G06F 3/0362*     (2013.01)
    *G04G 17/08*     (2006.01)
    *G04G 21/02*     (2010.01)
    *G06F 1/16*     (2006.01)
    *G06F 3/03*     (2006.01)
    *G04C 3/00*     (2006.01)
    *G06F 3/0484*     (2013.01)

(52) U.S. Cl.
    CPC ............ *G04G 21/025* (2013.01); *G06F 1/163* (2013.01); *G06F 3/0312* (2013.01); *G06F 3/0317* (2013.01); *G06F 3/0484* (2013.01)

(56) References Cited

U.S. PATENT DOCUMENTS

| | | | |
|---|---|---|---|
| 2004/0207607 A1 | 10/2004 | Specks et al. | |
| 2006/0090088 A1* | 4/2006 | Choi ..................... | G06F 1/3215 713/300 |
| 2006/0139320 A1 | 6/2006 | Lang | |
| 2006/0158966 A1 | 7/2006 | Maire | |
| 2010/0074058 A1 | 3/2010 | Campbell | |
| 2013/0222293 A1 | 8/2013 | Chung | |
| 2013/0298080 A1 | 11/2013 | Griffin et al. | |
| 2014/0139422 A1 | 5/2014 | Mistry et al. | |
| 2017/0093451 A1* | 3/2017 | Chen ..................... | G04G 21/00 |

OTHER PUBLICATIONS

Chinese Office Action dated May 31, 2019, issued in Chinese Patent Application No. 201580072242.4.

\* cited by examiner

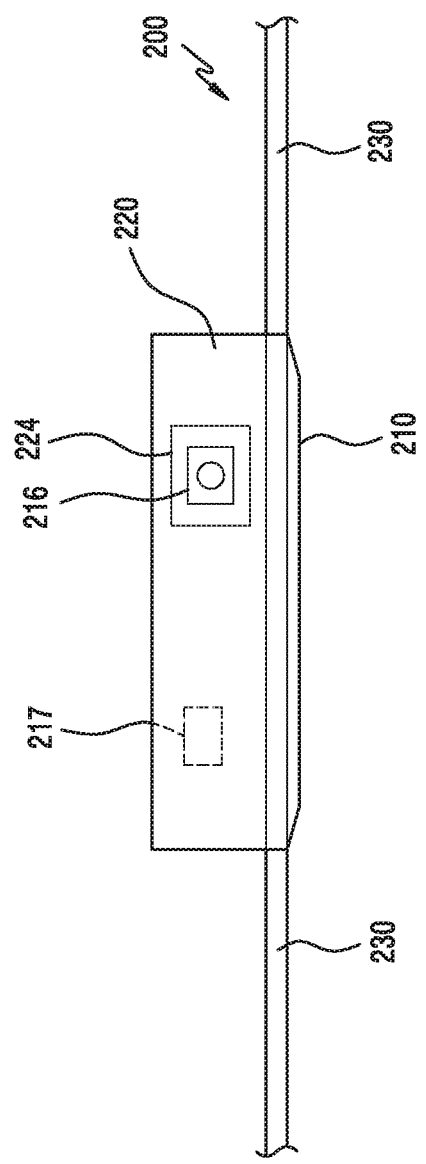

ELECTRONIC DEVICE COMPRISING ROTATING BODY AND CONTROL METHOD THEREFOR

TECHNICAL FIELD

Various embodiments of the present disclosure relate to an electronic device including a rotating body and a method of controlling the electronic device.

BACKGROUND ART

In recent years, electronic devices have evolved in the direction of becoming smaller, slimmer, and easier to carry while performing the same functions or greater variety thereof. These small electronic devices are usually carried in the state of being received in a user's pocket or the like, but may also be worn on a wrist, a head portion, or an arm of a human body.

In general, wearable devices, which are wearable on a human body or various structures, may include a main body, which performs functions inherent to an electronic device, and a connecting body, such as a strap, which is arranged to be drawn out from the main body by a predetermined length to be fixed to a human body or a structure. These wearable devices may be used alone, or may be used in a manner dependent on other electronic devices. In the case of being used in a manner dependent on other electronic devices, a communication method using a short-range communication module may be adopted, and the use of wearable electronic devices may save the troublesome and frequent use of the other electronic devices.

Meanwhile, since the wearable electronic devices are formed to be relatively small and slim, there are limitations in implementing the functions. Thus, such wearable electronic devices require efficient implementation of various functions in hardware or software.

DETAILED DESCRIPTION OF THE INVENTION

Technical Problem

According to various embodiments, conventional electronic devices may include various physical input devices in the periphery thereof in addition to a touch-type display as an input unit. According to one embodiment, such physical input devices may be one or more buttons. These buttons may be used alone or in cooperation with a touch-type display. However, these buttons are merely used for inputting data or performing a corresponding function, but cannot be used to replace at least one function in cooperation with a User Interface (UI).

According to one embodiment, the physical input devices may include a wheel-type button, which is rotatably mounted in place in the electronic device. Such a wheel-type button merely performs a corresponding function by recognizing only the rotating speed or the rotating direction of a wheel key, but is not used in a manner in which the corresponding function according to the rotated position of the wheel key is replaceable.

Various embodiments of the present disclosure may provide an electronic device including a rotating body that is capable of performing various functions according to rotation parameters and a control method thereof.

Various embodiments of the present disclosure may provide an electronic device that implements various functions according to the rotated position of the rotating body and a control method thereof.

Various embodiments of the present disclosure may provide an electronic device that is provided with a rotating body including a separate display to be capable of implementing various functions and a control method thereof.

Technical Solution

According to various embodiments, there may be provided a main body that includes at least one electronic component, a rotating body that is rotatably provided in a manner of enclosing at least a region of the main body, a rotation-detecting member that detects a rotation parameter of the rotating body, and at least one processor that causes the electronic device to perform a corresponding function based on the detected rotation parameter.

According to various embodiments, an electronic device including the above-mentioned components may provide a process of detecting a rotation parameter according to the rotation of the rotating body, and a method of performing a corresponding function of the electronic device according to the detected rotation parameter.

Advantageous Effects

Since the electronic device according to various embodiments can perform various corresponding functions according to the rotated position of the rotating body, it is possible to use various UIs with one input device.

BRIEF DESCRIPTION OF THE DRAWINGS

FIGS. 5A and 5B are views each illustrating the state in which a corresponding function is performed according to the rotation of the rotating body of the electronic device according to various embodiments of the present disclosure;

MODE FOR CARRYING OUT THE INVENTION

Figure 1:
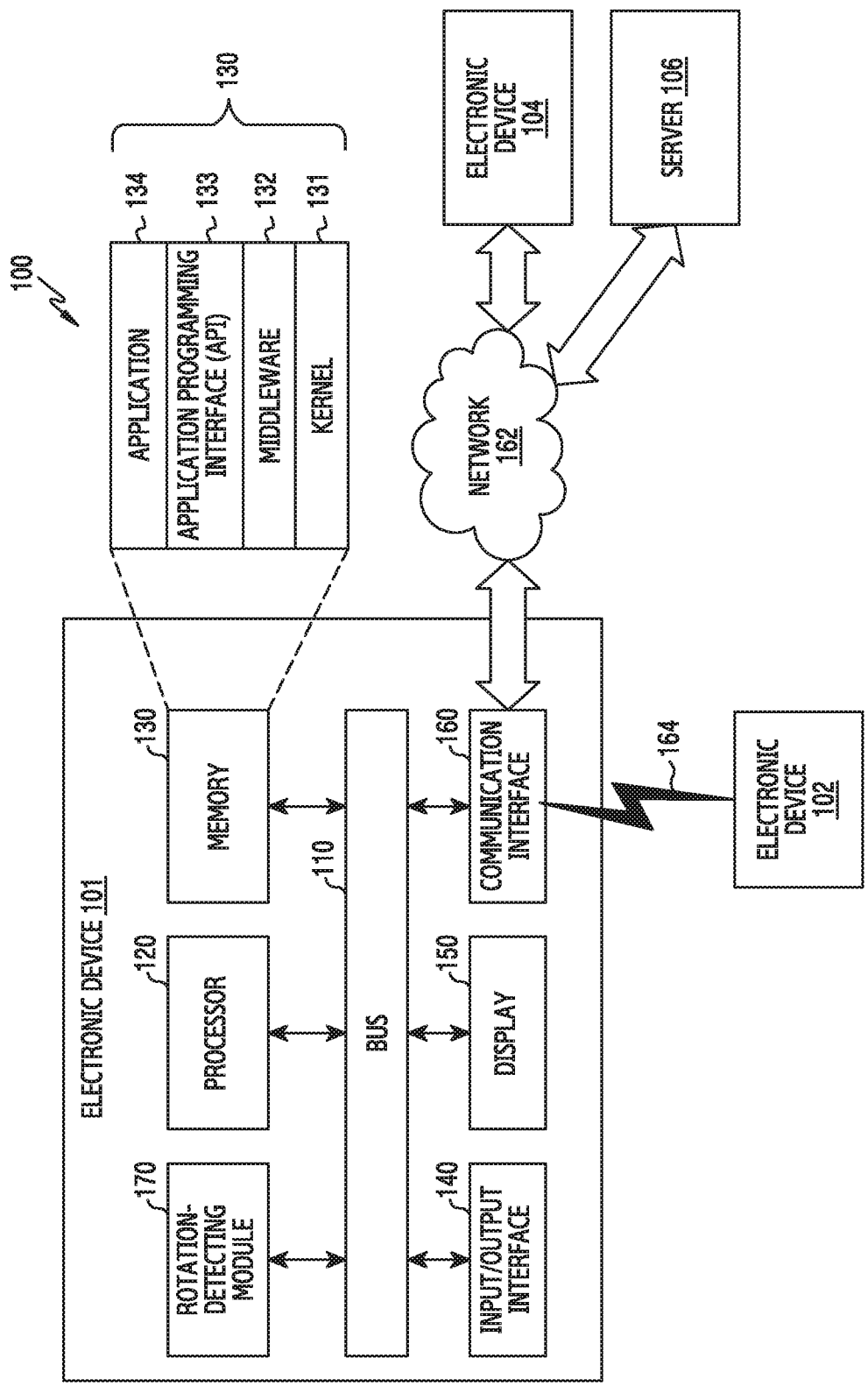
FIG. 1 is a view illustrating a network environment that includes an electronic device according to various embodiments of the present disclosure.

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. For example, a first element may be termed a second element, and similarly, a second element may be termed a first element without departing from the scope of the present disclosure.

When it is described that a certain structural element "is connected to" or "is in contact with" another structural element, it should be understood that although the certain structural element is directly connected to or is in direct contact with another structural element, still another structural element may be interposed therebetween. Conversely, when one component element is "directly coupled" or "directly connected" to another component element, it may be construed that a third component element does not exist between the first component element and the second component element.

The terms in various embodiments of the present disclosure are used to describe a specific embodiment, and are not intended to limit the present disclosure. A singular expression may include a plural expression unless they are definitely different in a context.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device with a communication function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

FIG. 1 is a view illustrating a network environment 100 that includes an electronic device 101 according to various embodiments of the present disclosure.

Referring to FIG. 1, an electronic device 101 may include a bus 110, a processor 120, a memory 130, an input/output interface 140, a display 150, and a communication interface 160.

The bus 110 may be a circuit that interconnects the above-mentioned components and transmits communication (e.g., a control message) between the components.

The processor 120 may receive commands from the other above-mentioned components (e.g., the memory 130, the input/output interface 140, the display 150, and the communication interface 160) through, for example, the bus 110, may decode the received commands, and may execute an arithmetic operation or data processing based on the decoded commands.

The memory 130 may store commands or data that are received from the processor 120 or the other components (e.g., the input/output interface 140, the display 150, and the communication interface 160) or are produced by the processor 120 or the other components. The memory 130 may include, for example, programming modules, such as a kernel 131, a middleware 132, an Application Programming Interface (API) 133, and an application program (or an "application") 134. Each of the above-mentioned programming modules may be configured by software, firmware, hardware, or a combination of two or more of them.

The kernel 131 may control or manage system resources (e.g., the bus 110, the processor 120, or the memory 130) that are used for executing operations or functions that are implemented in the other programming modules (e.g., the middleware 132, the API 133, or the application 134). In addition, the kernel 131 may provide an interface that may access individual components of the electronic device 101 from the middleware 132, the API 133, or the application 134 so as to control or manage the individual components.

The middleware 132 may play an intermediary role such that the API 133 or the application 134 may communicate with the kernel 131 so as to exchange data. In addition, in connection with one or more task requests received from one or more applications 134, the middleware 132 may perform a control for the task requests (e.g., scheduling or load balancing) by using, for example, a method of assigning the priority to be capable of using the system resource of the electronic device 101 (e.g., the bus 110, the processor 120, or the memory 130) to at least one of the applications 134.

The API 133 is, for example, an interface that allows the applications 134 to control functions provided from the kernel 131 or the middleware 132, and may include, for example, one or more interfaces or functions (e.g., commands) for a file control, a window control, an image processing, or a character control.

According to various embodiments, the applications 134 may include an SMS/MMS application, an e-mail application, a calendar application, an alarm application, a healthcare application (e.g., an application that measures a work rate, blood sugar, or the like), an environment information application (e.g., an application that provides information about atmospheric pressure, humidity, temperature, or the like), or the like. Additionally or alternatively, the applications 134 may include an application related to information exchange between the electronic device 101 and an external electronic device (e.g., the electronic device 104). The application related to information exchange may include, for example, a notification relay application to transmit specific information to the external electronic device, or a device management application to manage the external electronic device.

For example, the notification relay application may include a function of relaying notification information generated from any other application of the electronic device (e.g., the SMS/MMS application, the e-mail application, the healthcare application, or the environment information application) to the external electronic devices (e.g., the electronic devices 104). Additionally or alternatively, the notification relay application may receive notification information from, for example, an external electronic device (e.g., the electronic device 104), and may provide the notification information to the user. The device management application may manage (e.g., install, delete, or update) at least one function of an external electronic device (e.g., the electronic device 104) that communicates with the electronic device 101 (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to various embodiments, the applications 134 may include an application designated according to an attribute (a kind of an electronic device) of the external electronic device (e.g., the electronic device 104). For example, in the case where the external electronic device is an MP3 player, the applications 134 may include an application related to music reproduction. Likewise, in the case where the external electronic device is a mobile medical device, the applications 134 may include an application related to healthcare. According to one embodiment, the applications 134 may include at least one of an application that is designated to the electronic device 101 and an application that is received from an external electronic device (the server 106 or the electronic device 104).

The input/output interface 140 may transmit commands or data input by a user through an input/output device (e.g., a sensor, a keyboard, or a touch screen) to the processor 120, the memory 130, or the communication interface 160 through, for example, the bus 110. For example, the input/output interface 140 may provide data for a user's touch, which is input through a touch screen, to the processor 120. In addition, the input/output interface 140 may output commands or data, which have been received from the processor 120, the memory 130, or the communication interface 160 through, for example, the bus 110, through the input/output device (e.g., a speaker or a display). For example, the input/output interface 140 may output voice data, which have been processed through the processor 120, to the user through a speaker.

The display 150 may display various pieces of information (e.g., multimedia data or text data) to the user.

The communication interface 160 may connect communication between the electronic device 101 and an external device (e.g., the electronic device 104 or the server 106). For example, the communication interface 160 may be connected to a network 162 through wireless communication or wired communication so as to communication with the external device. The wireless communication may include at least one of, for example, Wireless Fidelity (WiFi), Bluetooth (BT), Near Field Communication (NFC), Global Positioning System (GPS), and cellular communication (e.g., LTE, LTE-A, CDMA, WCDMA, UMTS, WiBro, or GSM). The wired communication may include at least one of, for example, Universal Serial Bus (USB), High Definition Multimedia Interface (HDMI), Recommended Standard 232 (RS-232), and Plain Old Telephone Service (POTS).

According to one embodiment, the network 162 may be a communication network. The communication network may include at least one of a computer network, the Internet, the Internet of Things, and a telephone network. According to one embodiment, a protocol for communication between the electronic device 101 and an external device (e.g., a transport layer protocol, a data link layer protocol, or a physical layer protocol) may be supported by the applications 134, the application programming interface 133, the middleware 132, the kernel 131, and the communication interface 160.

According to one embodiment, the electronic device 101 may include a rotation detecting module 170. The rotation detecting module 170 may be an encoder sensor that detects a plurality of openings formed at predetermined intervals in the rotating body. According to one embodiment, the rotation detecting module 170 may be an image sensor that detects a specific pattern formed on the rotating body. According to one embodiment, the rotation detecting module 170 may provide rotation parameters of the rotating body to a processor 120.

According to one embodiment, the processor 120 may perform various functions of the electronic device based on the rotation parameters provided from the rotation detecting module 170.

Various embodiments of the present disclosure are illustrated and described with respect to a wrist-wearable electronic device, which is worn on a wrist, and a bezel-shaped rotating body surrounding the entire display, but are not limited thereto. For example, the electronic device may include a rotating body that is disposed separate from a main display, or is in a manner indisposed as a portion of the main display.

Figure 2:
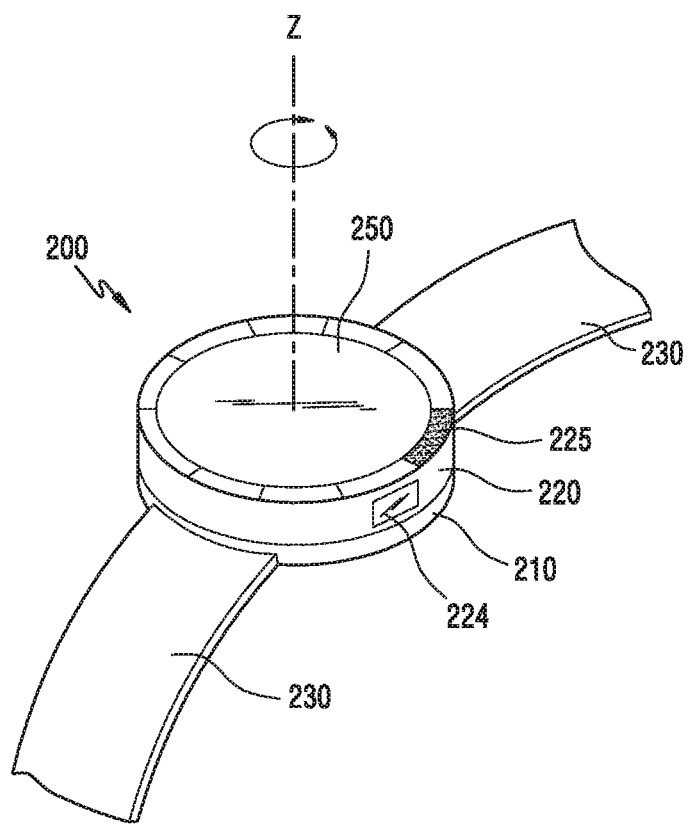
FIG. 2 is a perspective view illustrating an electronic device according to various embodiments of the present disclosure.

FIG. 2 is a perspective view illustrating an electronic device 200 according to various embodiments of the present disclosure.

Referring to FIG. 2, the electronic device 200 is a wrist-wearable electronic device that can be worn on the user's wrist. According to one embodiment, the electronic device 200 may include a main body 210 and connecting portions (e.g., straps) 230 that are mounted to the main body 210. According to one embodiment, the electronic device 200 may be worn in a manner in which the connecting portions 230 are wound on the wrist in the state in which the main body 210 is placed on the wrist, and the connecting portions 230 include a plurality of wrist adjustment openings (not illustrated), so that the wearing position can be adjusted to suit the user's wrist. According to one embodiment, the connecting portions 230 may be formed of at least one of metal, leather, rubber, silicon, and urethane.

According to various embodiments, the main body 210 may include a display 250. The display 250 may be applied in a touch screen type. According to one embodiment, at least one key button (not illustrated) may be disposed in a suitable location on the main body 210. According to one embodiment, a battery (e.g., a rechargeable battery) may be applied to the inside of the electronic device 200 as a power supply unit, and the electronic device 200 may be selectively mounted on a predetermined portable charging cradle so as to charge the battery.

According to various embodiments, the electronic device 200 may include a rotating body 220 that is rotatably installed to the main body 210. According to one embodiment, the rotating body 220 may be installed in a manner in which the rotating body 220 surround the entire display 250 disposed in the main body 210. According to one embodiment, when the electronic device 200 is a wrist-wearable electronic device, the rotating body 220 may be disposed in a rotatable bezel type. According to one embodiment, the rotating body 220 may be rotated clockwise or counterclockwise about a z-axis as a rotating axis, or may be configured to limit the rotation amount to a maximum of 360 degrees, or to rotate indefinitely. According to one embodiment, the rotating body 220 may include an indicator 225 along the rim on the top face thereof. According to one embodiment, the indicator 225 may be formed by applying a coating material to the rotating body 220, imprinting the indicator 225 or providing a display. According to one embodiment, the indicator 225 may be disposed at a position where the indicator 225 can be easily seen by the user, thereby enabling the user to easily recognize the rotating direction and the rotation amount of the rotating body 220.

According to various embodiments, the rotating body 220 may include at least one functional window 224 disposed on an outer circumferential face. According to one embodiment, various sensor devices may be arranged in the main body 210, as will be described later. The functional window 224 may be disposed at a position corresponding to at least one sensor of the sensor devices according to the rotation of the rotating body 220. According to one embodiment, the electronic device 200 may sense the rotated position of the rotating body 220, and may automatically perform the function of a corresponding sensor according to the position of the functional window 224 according to the rotation of the rotating body 220, or may display the function on the display 250.

According to various embodiments, the electronic device 200 may perform various functions according to the rotation parameters of the rotating body 220, regardless of the functional window 224. According to one embodiment, the rotation parameters may include at least one of a rotating direction, a rotating speed, a rotation amount, and a rotated position of the rotating body.

Figure 3:
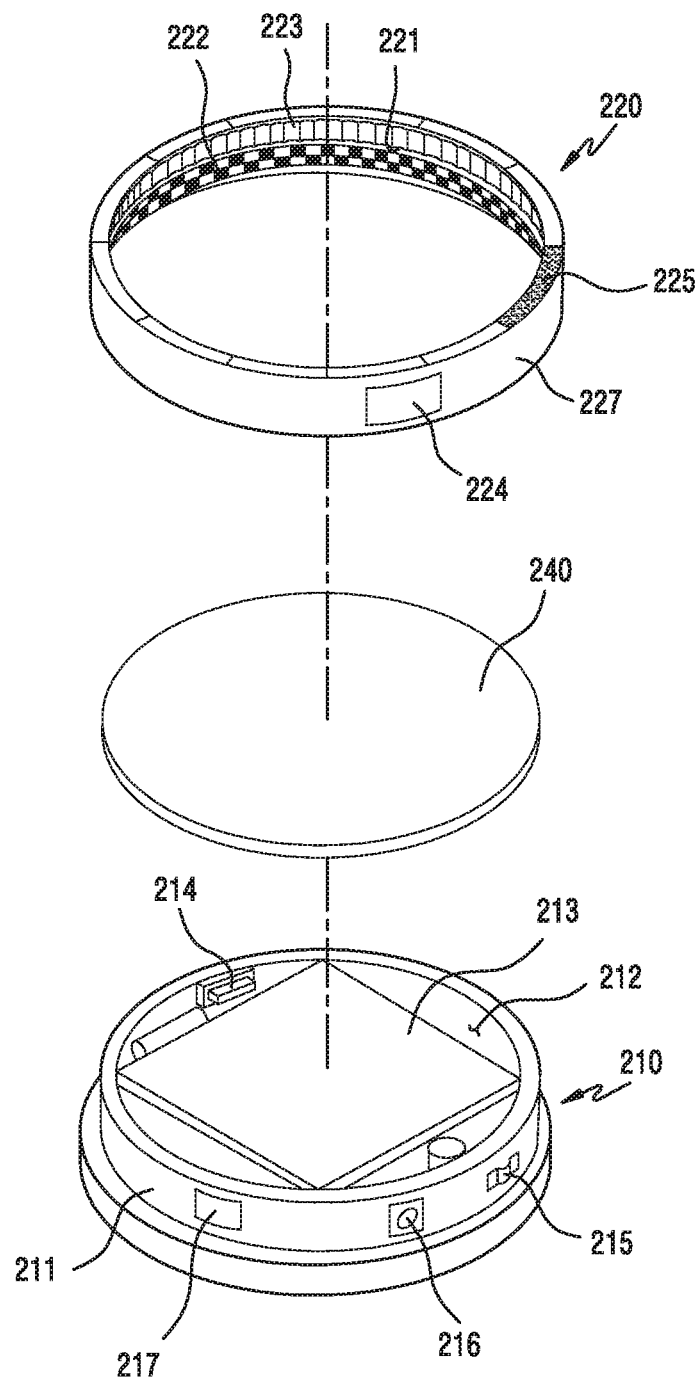
FIG. 3 is an exploded perspective view illustrating an electronic device according to various embodiments of the present disclosure.

FIG. 3 is an exploded perspective view illustrating an electronic device 200 according to various embodiments of the present disclosure.

Referring to FIG. 3, the electronic device 200 may include a main body 210 and a rotating body 220 that is rotatably installed to the main body 210. According to one embodiment, various electronic components may be disposed in the inner space of the main body 210. According to one embodiment, the electronic components may include a display module 213. The display module 213 may include a touch-type input sensor. According to one embodiment, the display module 213 may include an input sensor (e.g., a digitizer) for recognizing an indirect touch of a hovering type, made by an electronic pen.

According to various embodiments, the electronic component may include a rotation-detecting member 214 that is capable of sensing the rotation of the rotating body 220. According to one embodiment, the rotation-detecting member 214 may be an encoder sensor for detecting a plurality of openings formed at predetermined intervals in the rotating body 220. According to one embodiment, the rotation-detecting member 214 may be an image sensor that detects a specific pattern formed on the rotating body 220. The rotation-detecting member 214 may be an infrared ray sensor. The rotation-detecting member 214 may be a photo coupler.

According to various embodiments, the electronic components may include various sensor devices disposed in the main body 210. According to one embodiment, the sensor devices may include various sensors, such as a camera sensor, a fingerprint recognition sensor, an infrared sensor, an HRM sensor, a photo sensor, a proximity sensor, an illuminance sensor, and a temperature sensor. According to one embodiment, when a function is performed through the functional window 224 included in the rotating body 220, the corresponding sensors may be disposed in a such manner in which the sensors can be exposed to the corresponding outer circumferential face on which the rotating body 220 of the electronic device 200 is installed.

According to various embodiments, at least one engagement member (e.g., a detent or a latch) 215 may be disposed on the outer circumferential face 211 to which the rotating body 220 of the main body 210 is rotatably installed. The engagement member 215 is installed in a manner of being in contact with the rotating body 220 in the main body 210, and can maintain the rotated position of the rotating body 220. According to one embodiment, the engagement member 215 may provide a rotating sensation (e.g., a clicking sensation) to the user when the user rotates the rotating body 220.

According to various embodiments, the rotating body 220 is formed to be hollow and may be rotatably installed in a manner in which the outer circumferential face 211 of the body 210 surrounds the inner circumferential face 221. According to one embodiment, the rotating body 220 may be provided with a detection target 222 to be detected by the above-described rotation-detecting member 214 along the inner circumferential surface 221. According to one embodiment, when the rotation-detecting member 214 is an image sensor, the detection target 222 may be a sanding pattern in which black and white colors are alternately formed. According to one embodiment, when the rotation-detecting member 214 is an image sensor, the detection target 222 may have a form in which a specific pattern is sanded. In this case, the image sensor may identify the specific sanded pattern to detect the rotated position of the rotating body, and provide the detection result to the processor of the electronic device.

According to various embodiments, the rotating body 220 may include engagement recesses 223 formed along the inner circumferential surface 221. According to one embodiment, the engagement recesses 223 may be continuously formed along the inner circumferential face 221 of the rotating body 220. According to one embodiment, when the rotating body 220 is rotatably mounted on the main body 210 and is then rotated in a predetermined direction, the engagement member 215 operates in a manner in which the engagement member 215 rides over a neighboring engagement recess from one engagement recess, so that it is possible to provide an engagement sensation (e.g., example, clicking sensation) at every predetermined rotation angle according to the rotation of the rotating body 220.

According to various embodiments, the rotating body 220 may include an indicator 225 on the top face thereof. The indicator 225 may be formed in a manner of being imprinted or printed thereon. According to one embodiment, the indicator 225 may provide rotation-related information that allows the user to easily recognize the rotation amount and direction of the rotating body 220.

According to various embodiments, the functional window 224 may be disposed on the outer circumferential face 227 of the rotating body 220. According to one embodiment, the functional window 224 may be formed of a transparent material or a translucent material. According to one embodiment, the functional window 224 may be formed of a glass material or a synthetic resin material. According to one embodiment, the functional window 224 may be arranged in a manner in which the functional window 224 can perform the functions of the sensors 216 and 217, which are exposed to the outer circumferential face 211 of the main body 210 through the functional window 224 when the rotating body 220 is rotatably assembled with the main body 210.

According to various embodiments, the main body 210 may include a main body window 240 that protects the display module 213 and forms the exterior of the electronic device 200. According to one embodiment, the rotating body 220 may be rotatably installed to the main body 210 in the state in which the main body window 240 is assembled to the main body 210. According to one embodiment, the rotating body 220 may be formed of a synthetic resin material or a metallic material.

Figure 4:
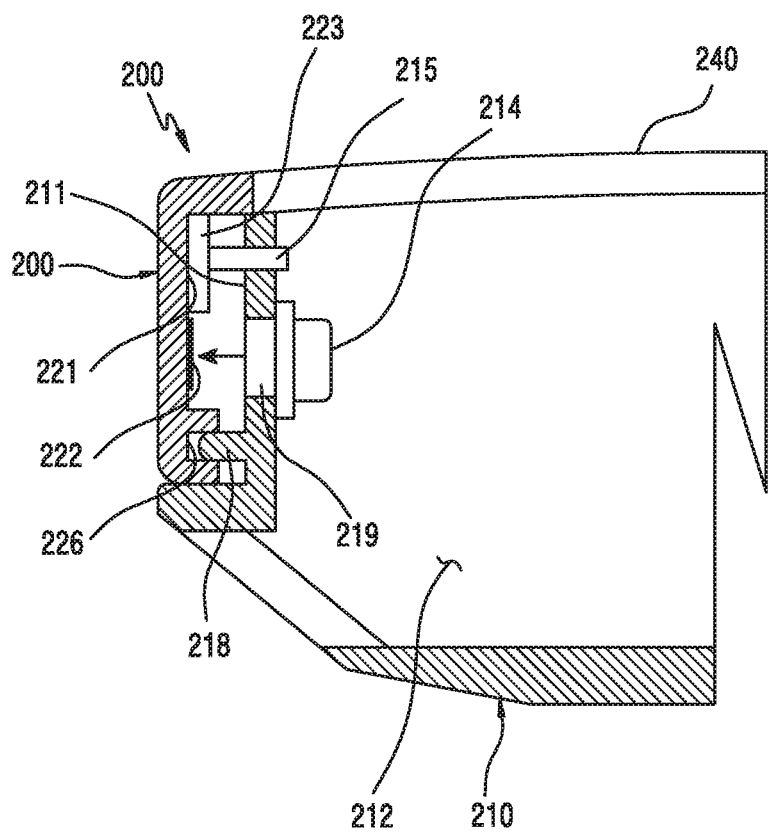
FIG. 4 is a sectional view illustrating a main portion of the electronic device according to various embodiments of the present disclosure in an assembled state.

FIG. 4 is a sectional view illustrating a main portion of the electronic device 200 according to various embodiments of the present disclosure in the assembled state.

Referring to FIG. 4, the electronic device 200 may include a main body 210 that includes a main body window 240 and a rotating body 220 that is rotatably installed to the main body 210. According to one embodiment, a guide rib 218 may protrude from the outer circumferential face 211 of the main body 210. According to one embodiment, a guide groove 226 may be formed at a corresponding position on the rotating body 220. Accordingly, when the rotating body 220 is installed to the main body 210, the guide rib 218 on the main body 210 is inserted into the guide groove 226 in the rotating body 220 and is then guided, so that the rotating body 220 can perform a rotating operation while being restrained without becoming detached from the main body 210. According to one embodiment, the guide rib 218 may be provided on the rotating body 220, and the guide groove 226 may be formed at a corresponding position in the main body 210.

According to various embodiments, the rotation-detecting member 214 may be installed in the inner space 212 of the main body 210, so that the detection target disposed on the inner circumferential face of the rotating body can be detected through the opening 219 while the rotating body rotates. According to one embodiment, the rotation-detecting member 214 may be at least one of an encoder sensor, an optical sensor, and an image sensor. According to one embodiment, the rotation-detecting member 214 is disposed in the inner space 212 of the main body 210, but is not limited thereto. For example, when space is available, the rotation-detecting member 214 may be installed on the outer circumferential face 211 of the main body 210 in the space between the main body 210 and the rotating body 220.

According to various embodiments, the engagement member 215 may be disposed to protrude from the outer circumferential face 211 through the inner space 212 of the main body 210 and to be engaged with the engagement groove 223 formed in the inner circumferential surface 221 of the rotating body 220. According to one embodiment, the engagement member 215 may be disposed to be attached to the outer circumferential face 211 of the main body 210. According to one embodiment, the engagement member 215 may be a detent or a latch using a spring.

Figure 5B:
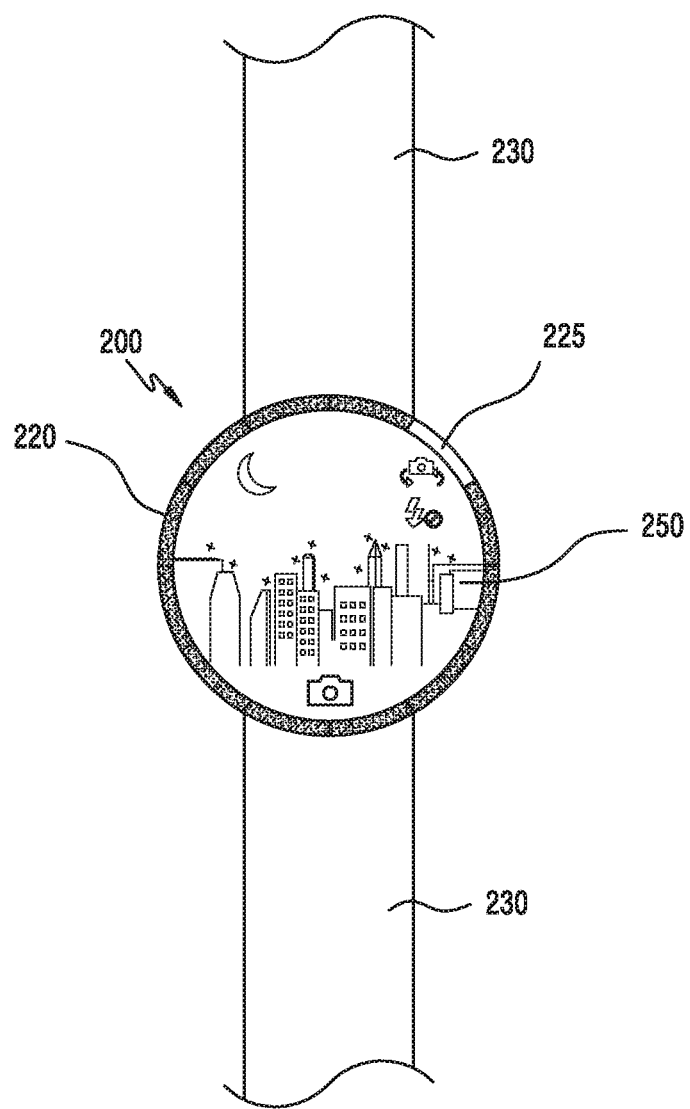

FIGS. 5A and 5B are views each illustrating the state in which a corresponding function is performed according to the rotation of the rotating body 220 of the electronic device 200 according to various embodiments of the present disclosure.

Referring to FIGS. 5A and 5B, in the state in which the rotating body 220 has rotated to the first position (the position of the indicator in FIG. 5B), the functional window 224 disposed on the rotating body 220 may be disposed at a position corresponding to the camera sensor 216 installed in the main body 210. In this case, the functional window 224 may be formed of a transparent material. According to one embodiment, the electronic device 200 may be provided with the rotation parameters of the rotating body 220 from the rotation-detecting member 214, and can automatically enter the camera imaging mode. According to one embodiment, when the user has recognized in advance only the rotation amount of the rotating body 220 corresponding to the camera function of the rotating body 220 (even if the user does not recognize the function, the corresponding function may be printed or imprinted thereon), the electronic device 200 can automatically enter the camera imaging mode only by the operation of rotating the rotating body 220 by a corresponding angle.

Figure 6A:
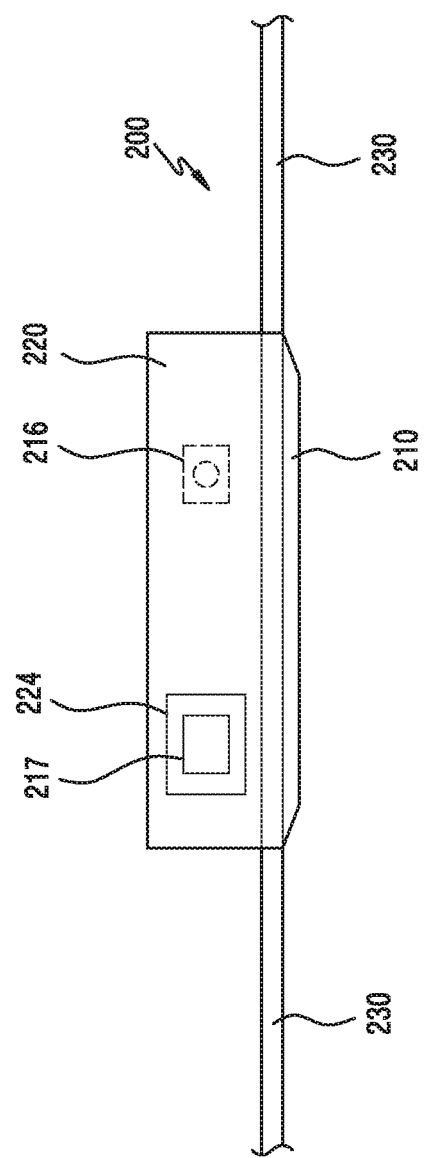
FIGS. 6A and 6B are views each illustrating the state in which a corresponding function is performed according to the rotation of the rotating body of the electronic device according to various embodiments of the present disclosure.
Figure 6B:
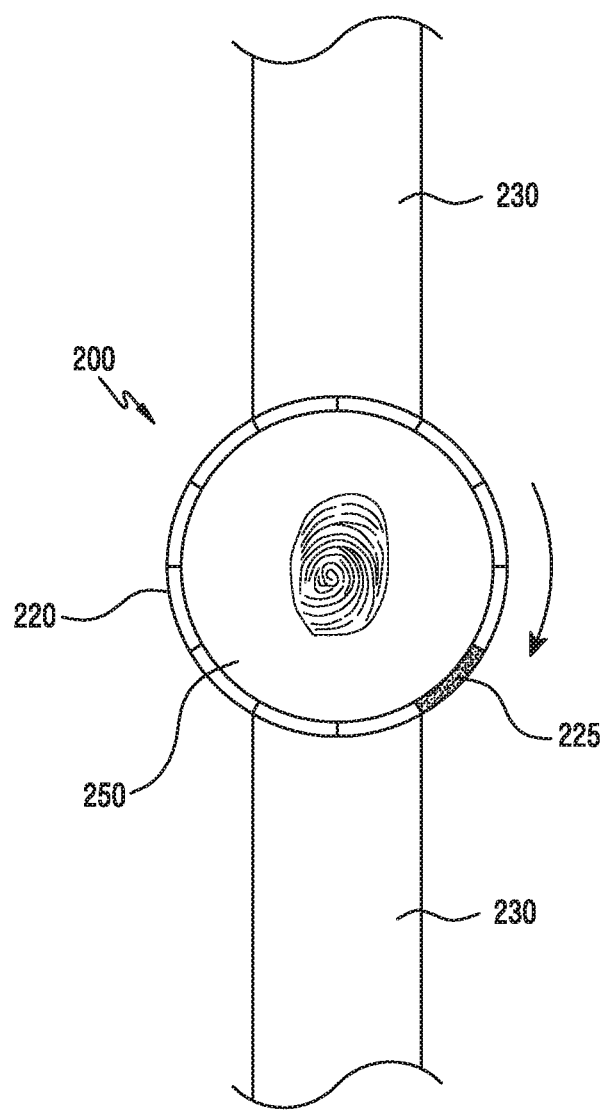

FIGS. 6A and 6B are views each illustrating the state in which a corresponding function is performed according to the rotation of the rotating body 220 of the electronic device 200 according to various embodiments of the present disclosure.

Referring to FIGS. 6A and 6B, in the state in which the rotating body 220 has rotated to the second position (the position of the indicator in FIG. 6B), the functional window 224 disposed on the rotating body 220 may be disposed at a position corresponding to a fingerprint recognition sensor 217 installed in the main body 210. In this case, the functional window 224 may be formed of a transparent material. According to one embodiment, the electronic device 200 may be provided with the rotation parameters of the rotating body 220 from the rotation-detecting member 214, and can automatically enter the fingerprint recognition mode. According to one embodiment, when the user has recognized in advance only the rotation amount of the rotating body 220 corresponding to the fingerprint recognition function of the rotating body 220 (even if the user does not recognize the function, the corresponding function may be printed or imprinted thereon), the electronic device 200 can automatically enter the fingerprint recognition mode only by the operation of rotating the rotating body 220 by a corresponding angle.

According to various embodiments, the rotating body may not include the functional window. In this case, the electronic device may automatically perform specific functions corresponding to the rotation parameters detected according to the rotation of the rotating body. According to one embodiment, the electronic device can automatically perform the camera function when it is detected that the rotating body is rotated 45 degrees clockwise. According to one embodiment, when it is detected that the rotating body is rotated 90 degrees clockwise, the music execution may be automatically performed or the music execution entry screen may be automatically displayed on the display.

According to various embodiments, specific functions performed according to the rotation parameters of the rotating body may be pre-set by the manufacturer of the electronic device. However, without being limited thereto, specific functions may be set and used by the user of the electronic device.

Figure 7:
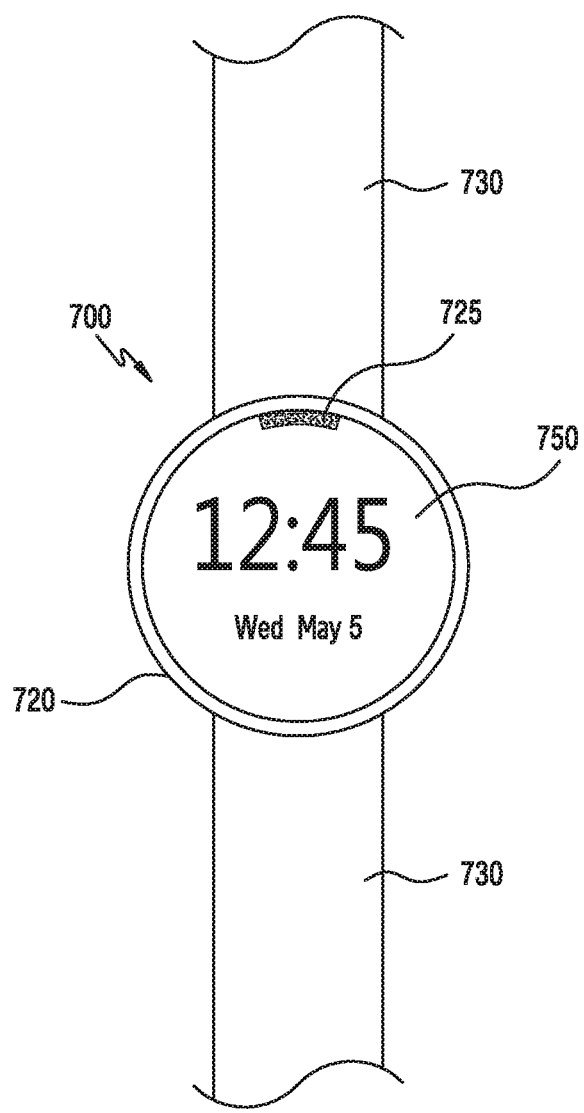
FIG. 7 is a view illustrating the state in which an indicator of an electronic device is implemented on a display according to various embodiments of the present disclosure.

FIG. 7 is a view illustrating the state in which an indicator 725 of an electronic device 700 is implemented on a display according to various embodiments of the present disclosure.

Referring to FIG. 7, the electronic device 700 illustrated therein is also a wrist-wearable electronic device. According to one embodiment, the electronic device 700 includes a rotating body 720 in a main body (not illustrated), and may include a connecting portion 730 for wearing the electronic device on a wrist.

In the above-described embodiment, the indicator is disposed in the rotating body. However, in the present exemplary embodiment, the indicator may be displayed as an indicator object 725 on the display 750. According to one embodiment, the electronic device 700 may be provided with rotation parameters of the rotating body 720 from the rotation-detecting member, and may display the corresponding indicator-shaped indicator object 725 at a corresponding position on the display 750. According to one embodiment, the indicator object 725 may be displayed in various forms as well as in a bar form.

According to various embodiments, the electronic device 700 may output the rotation parameters of the rotating body 720 via various output means. The electronic device 700 may output the rotation-related information of the rotating body 720 audibly through a speaker or tactually through a vibrator based on the rotation parameters provided from the rotation-detecting member. According to one embodiment, the electronic device 700 may provide rotation-related information, such as the rotation amount or angle, with a voice using a speaker. According to one embodiment, the electronic device 700 may provide rotation-related information, such as the rotation amount or angle, with an intensity of vibration using a vibrator. In such a case, the electronic device 700 may provide a relatively stronger vibration to the user as the rotation amount or the rotating angle increases.

Figure 8:
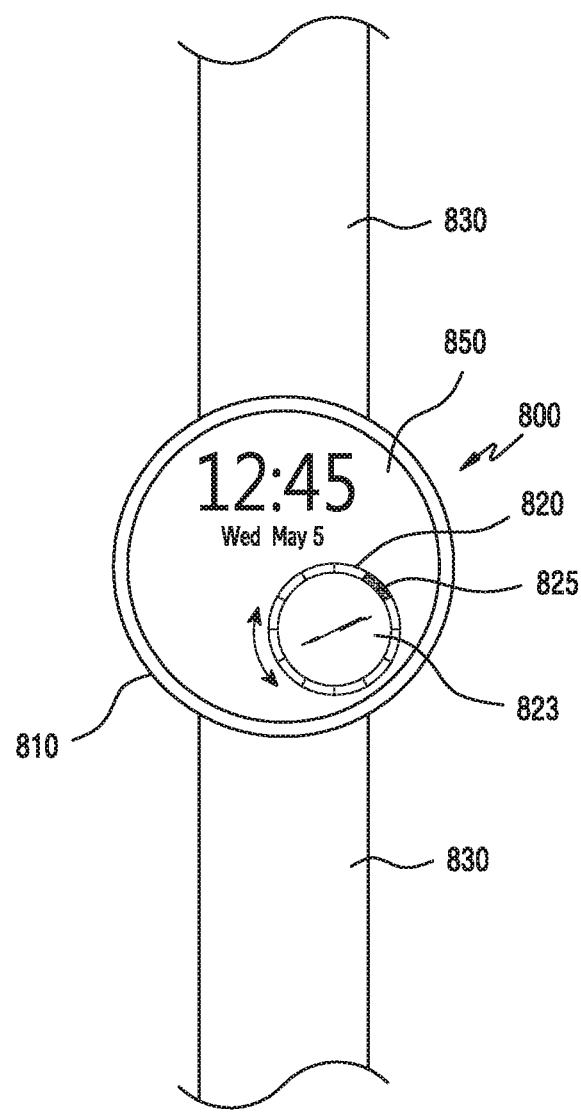
FIG. 8 is a view illustrating the configuration of an electronic device according to various embodiments of the present disclosure.

FIG. 8 is a view illustrating the configuration of an electronic device 800 according to various embodiments of the present disclosure.

Referring to FIG. 8, the electronic device 800 illustrated therein is also a wrist-wearable electronic device. According to one embodiment, the above-described electronic devices are configured in a manner in which the rotating body encloses one entire display region. However, in the present exemplary embodiment, the rotating body 820 may further include a separate display 823.

According to various embodiments, the electronic device 800 may include a main body 810 and a connecting portion 830 to be worn on a user's wrist. According to various embodiments, the main body 810 may include a first display 850. The first display 850 may be used as a main display of the electronic device 800. A rotatable rotating body 820 may be installed in a portion of the first display 850. According to one embodiment, the rotating body 820 may be rotated clockwise or counterclockwise on the first display 850, and may be rotated within a specific angular range or may be rotated indefinitely.

According to various embodiments, the rotating body 820 may further include a second display 823 disposed in an interior region thereof. According to one embodiment, the second display 823 may be used as a sub-display. The first display 850 and the second display 823 may be displayed in different ways. According to one embodiment, when the first display 850 displays information indicating that a first function is performed, the second display 823 may display information indicating that a second function related to the sub-items of the first function is performed.

According to various embodiments, the indicator 825 can be imprinted or printed on the rotating body 820. However, without being limited thereto, the indicator 825 may be displayed as an indicator object on the second display 823 according to the rotation of the rotating body 820. According to one embodiment, the indicator 825 may be displayed as an indicator object on the first display 850 in a region around the rotating body 820 according to the rotation of the rotating body 820.

Figure 9:
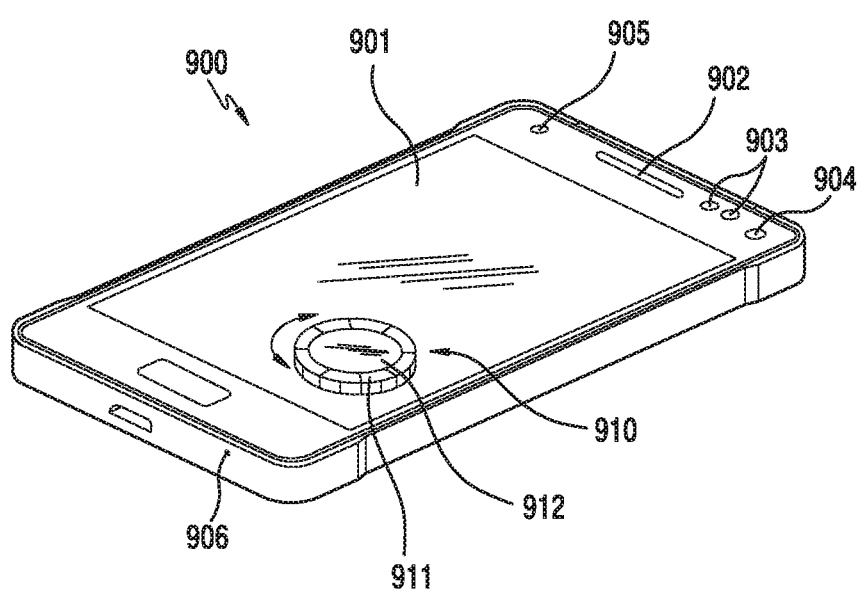
FIG. 9 is a view illustrating the configuration of an electronic device according to various embodiments of the present disclosure.

FIG. 9 is a view illustrating the configuration of an electronic device 900 according to various embodiments of the present disclosure.

In this exemplary embodiment, the electronic device 900 may be formed as a bar-type electronic device (e.g., a bar-type smart phone) rather than a wrist-wearable electronic device.

Referring to FIG. 9, a display 901 may be provided on the front face of the electronic device 900. A speaker device 902 may be disposed above the display 901 so as to receive a voice of a counterpart. A microphone device 906 may be disposed below the display 901 so as to transmit a voice of the user of the electronic device.

According to various embodiments, components for conducting various functions of the electronic device 900 may be arranged around the speaker device 902. The components may include one or more sensor modules 903. The sensor modules 903 may include at least one of, for example, an illuminance sensor (e.g., an optical sensor), a proximity sensor, an infrared sensor, and an ultrasonic sensor. According to one embodiment, the components may include a camera device 904. According to one embodiment, the components may further include an LED indicator 905.

According to various embodiments, the electronic device 900 may include a rotating body 910 that is arranged in at least a portion of the display 901 to be self-rotatable. According to one embodiment, the rotating body 910 may further include a separate sub-display 912. According to one embodiment, the sub-display 912 may display a separate function that is different from that of the display 901 of the electronic device 900. According to one embodiment, the display 901 and the sub-display 912 may be displayed in different ways. According to one embodiment, when the display 901 displays information indicating that a first function is performed, the sub-display 912 may display that a second function related to the sub-items of the first function is performed. However, without being limited thereto, still another function, which is not related to the first function, may be displayed on the sub-display 912. According to one embodiment, the rotating body 910 may not include the sub-display 912, and may be disposed in a region other than the display region of the electronic device.

Figure 10:
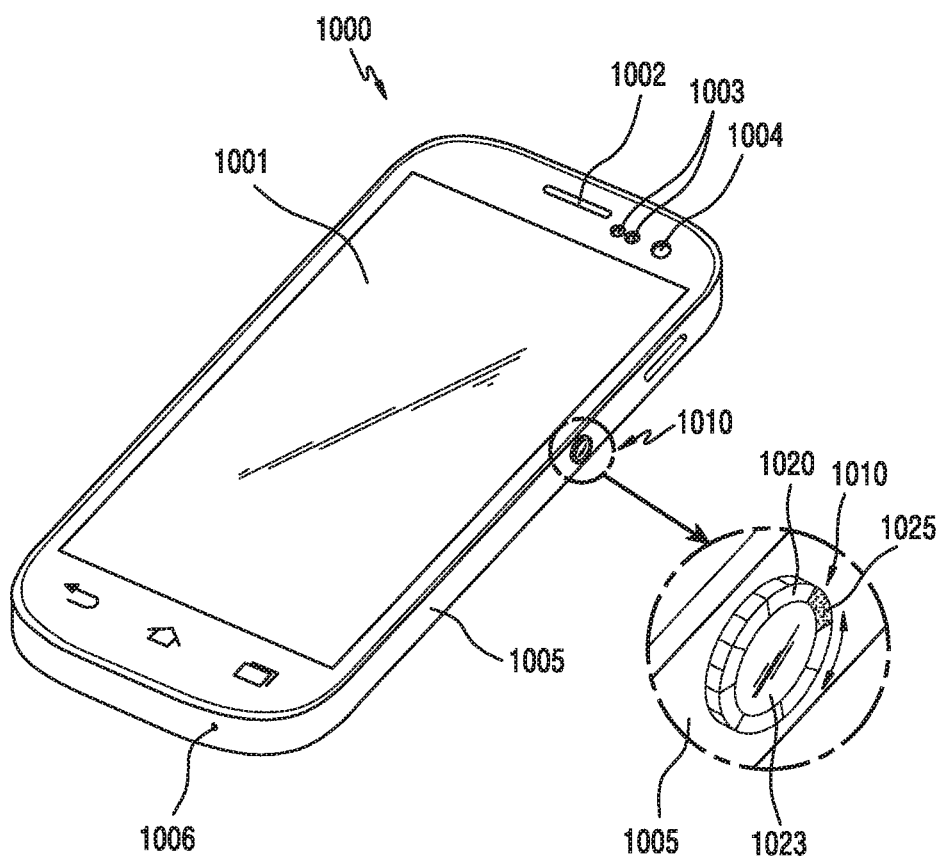
FIG. 10 is a view illustrating the configuration of an electronic device according to various embodiments of the present disclosure.

FIG. 10 is a view illustrating the configuration of an electronic device 1000 according to various embodiments of the present disclosure.

In this exemplary embodiment, the electronic device 1000 may be formed as a bar-type electronic device (e.g., a bar-type smart phone) rather than a wrist-wearable electronic device, and the rotating body may be disposed on a side face of the electronic device.

Referring to FIG. 10, a display 1001 may be provided on the front face of the electronic device 1000. A speaker device 1002 may be disposed above the display 1001 so as to receive a voice of a counterpart. A microphone device 1006 may be disposed below the display 1001 so as to transmit a voice of the user of the electronic device.

According to various embodiments, components for conducting various functions of the electronic device 1000 may be arranged around the speaker device 1002. The components may include one or more sensor modules 1003. The sensor modules 1003 may include at least one of, for example, an illuminance sensor (e.g., an optical sensor), a proximity sensor, an infrared sensor, and an ultrasonic sensor. According to one embodiment, the components may include a camera device 1004.

According to various embodiments, the electronic device 1000 may include a rotating body 1010 that is arranged in at least a portion of a side face 1005 to be self-rotatable. According to one embodiment, the rotating body 1010 may further include a separate sub-display 1023. According to one embodiment, the rotating body 1010 may further include an indicator 1025 for providing rotating information of the rotating body to the user. The indicator 1025 may be formed in a manner of being imprinted or printed on the rotating body 1010. According to one embodiment, the indicator 1025 may be displayed on the sub-display 1023 as an indicator object according to the rotation of the rotating body 1010.

According to one embodiment, the sub-display 1023 may display a separate function that is different from that of the display 1001 of the electronic device 1000. According to one embodiment, the display 1001 and the sub-display 1023 may be displayed in different ways. According to one embodiment, when the display 1001 displays information indicating that a first function is performed, the sub-display 1023 may display that a second function related to the sub-items of the first function is performed. However, without being limited thereto, still another function, which is not related to the first function, may be displayed on the sub-display 1023. According to one embodiment, one rotating body 1010 is provided on the side face 1005 of the electronic device 1000, but is not limited thereto. For example, at least two rotating bodies may be arranged at a predetermined interval.

Figure 11:
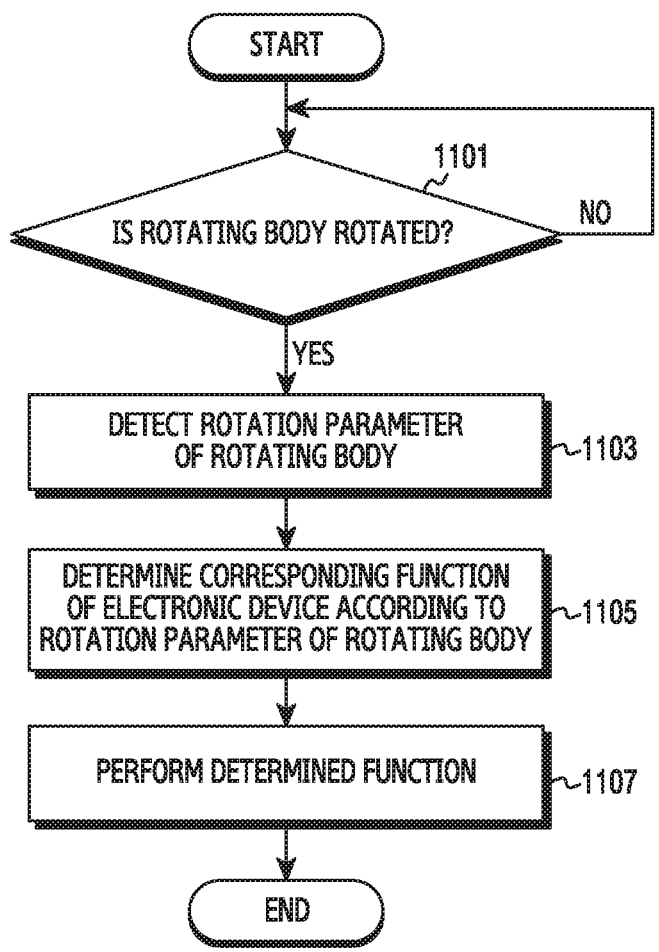
FIG. 11 is a flowchart of corresponding functions of an electronic device, which are performed according to the rotation of a rotating body according to various embodiments of the present disclosure.

FIG. 11 is a flowchart of corresponding functions of an electronic device, which are performed according to the rotation of a rotating body according to various embodiments of the present disclosure.

Referring to FIG. 11, the electronic device may perform operation 1101 to detect whether the rotating body is rotated. According to one embodiment, the rotating body may be rotated clockwise or counterclockwise by the user's manipulation of the rotating body. According to one embodiment, the rotating body may be rotated to a specific rotation angle. According to one embodiment, the electronic device may receive rotation-related information from the rotation-detecting member, which is provided on the main body and detects the rotating operation of the rotating body.

Thereafter, in operation 1103, the electronic device may detect the rotation parameters of the rotating body. The electronic device can detect the detection target disposed on the rotating body from the rotation-detecting member provided in the main body and can receive rotation-related information. The rotation parameters may include at least one of a rotation amount, a rotating speed, a rotating angle, and a rotated position of the rotating body.

Thereafter, in operation 1105, the electronic device may determine a corresponding function using the rotation-related information according to the provided rotation parameters of the rotating body, and in operation 1107, the electronic device may perform the corresponding function. For example, the sensor function corresponding to the functional window provided on the rotating body may be automatically performed according to the rotating operation of the rotating body. For example, when the functional window is located at a position corresponding to the camera sensor provided in the main body by the rotating body, the electronic apparatus may automatically enter the camera imaging mode. In this case, the electronic device may output a captured preview image from the camera sensor on the display. According to one embodiment, when the functional window is located at a position corresponding to the fingerprint recognition sensor provided in the main body by the rotating body, the electronic apparatus may automatically enter the fingerprint recognition mode. In this case, the electronic device may display the fingerprint image recognized by the fingerprint recognition sensor on the display of the electronic device.

Figure 12A:
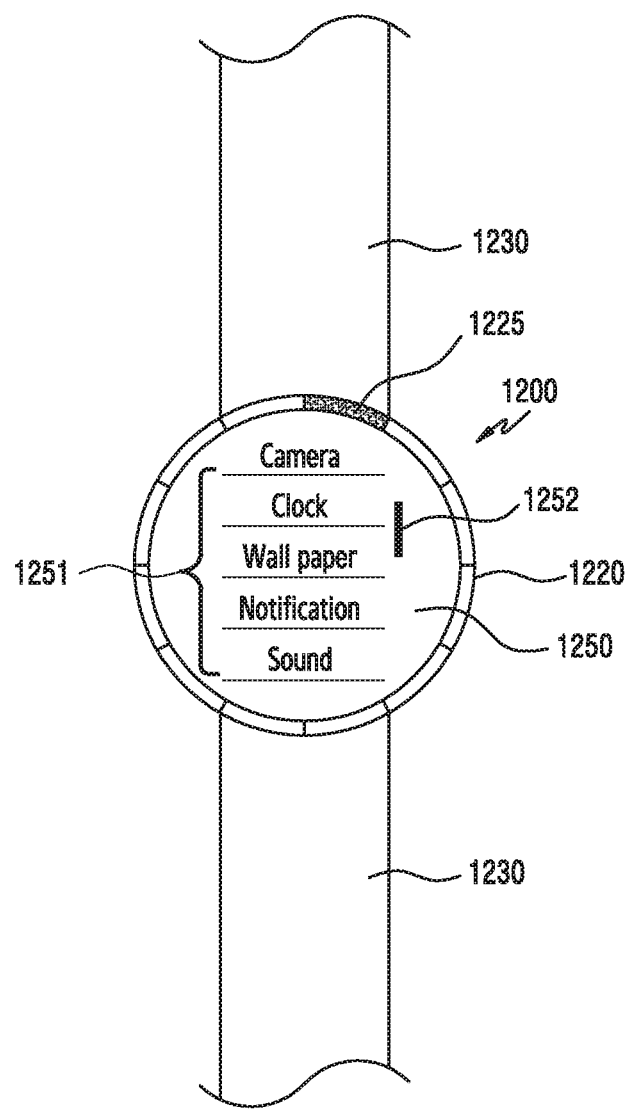
FIGS. 12A to 12C are views each illustrating the state in which different functions of an electronic device are performed according to the rotation of a rotating body according to various embodiments of the present disclosure.
Figure 12B:
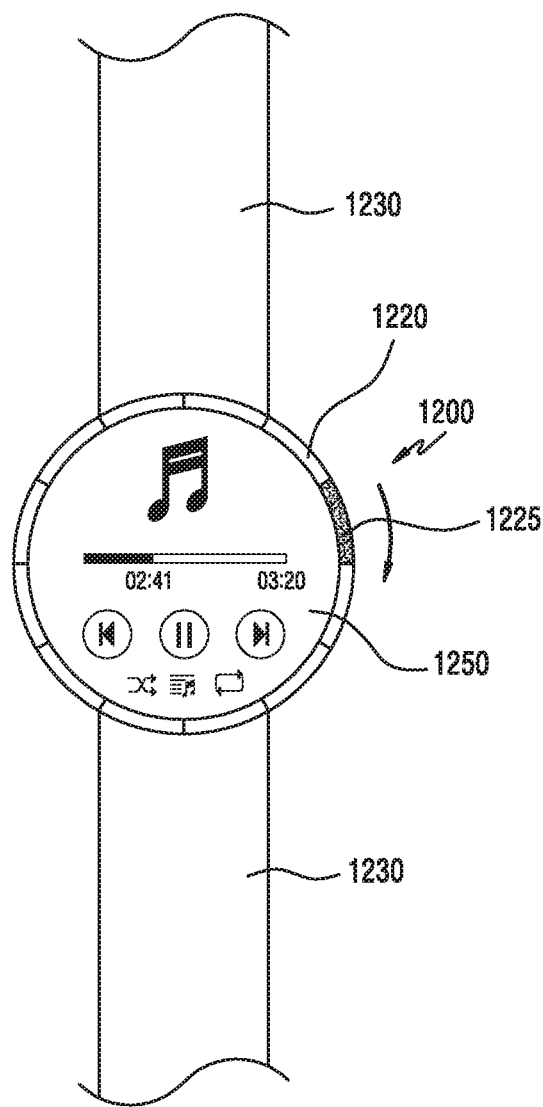
Figure 12C:
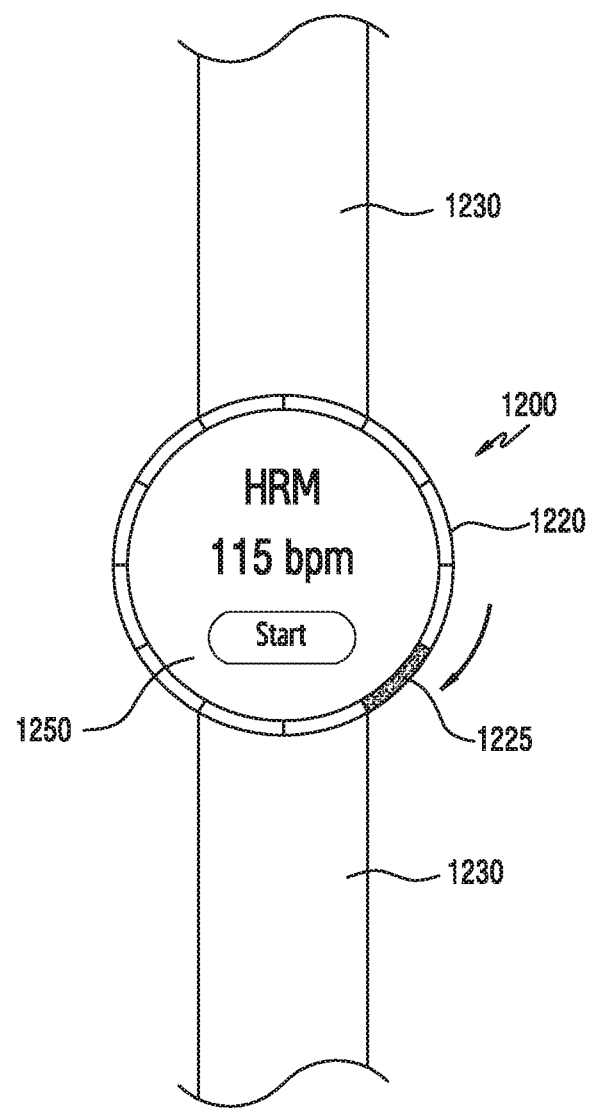

FIGS. 12A to 12C are views each illustrating the state in which different functions of an electronic device 1200 are performed according to the rotation of a rotating body 1220 according to various embodiments of the present disclosure.

According to various embodiments, the electronic device 1200 may directly perform the corresponding function according to at least one rotation parameter selected from a rotation amount, a rotating angle, a rotated position, and a rotating speed of the rotating body 1220. The electronic device 1200 may include a rotating body 1220 that is rotatably installed in a main body that is also connected by a connecting portion 1230.

Referring to FIG. 12A, items displayed on the display 1250 may be scrolled as the rotating body 1220 is rotated. According to one embodiment, a scroll bar 1252 may be displayed on one side of the items displayed on the display 1250. According to one embodiment, the items may be scrolled up or down depending on the rotation amount, rotating speed, and rotating angle of the rotating body 1220. According to one embodiment, when rotating the rotating body 1220 clockwise, the items 1251 and the scroll bar 1252 may be moved down. According to one embodiment, when rotating the rotating body 1220 counterclockwise, the items 1251 and the scroll bar 1252 may be moved up.

Referring to FIG. 12B, in the state in which the rotating body 1220 is rotated to a predetermined position (the state where the indicator of the rotating body of FIG. 12B is located), the electronic device 1200 may detect a corresponding rotation parameter so as to automatically perform a music reproducing function, and may automatically enter the music reproducing mode. In this case, the electronic device 1200 may automatically display a music reproducing screen on the display 1250.

Referring to FIG. 12C, in the state in which the rotating body 1220 is rotated to a predetermined position (the state where the indicator of the rotating body of FIG. 12C is located), the electronic device 1200 may detect a corresponding rotation parameter so as to measure the heart rate of the electronic device wearer. In this case, the electronic device 1200 may include a heart rate measuring sensor disposed on the bottom surface of the main body, and may perform a control such that the heart rate measuring sensor automatically operates when the rotating body 1220 rotates to the corresponding position. According to one embodiment, when the heart rate measuring sensor is activated, the electronic device 1200 may display the measured heart rate of the user on the display 1250.

Figure 13A:
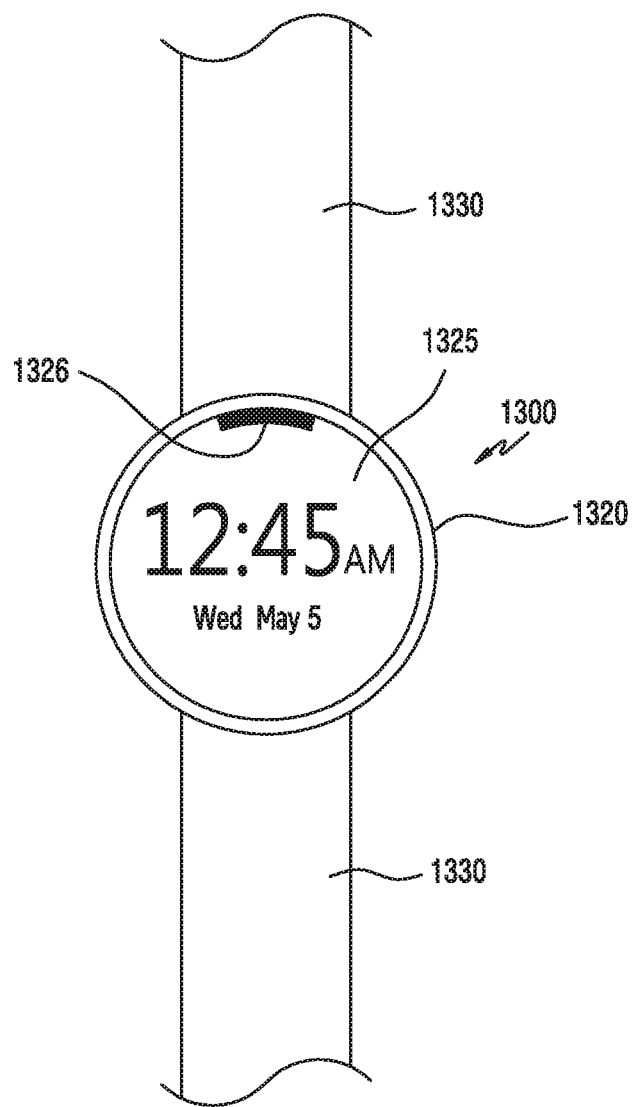
FIGS. 13A and 13B are views each illustrating the state of an electronic device when a predetermined time has passed after rotation of the rotating body according to various embodiments of the present disclosure.
Figure 13B:
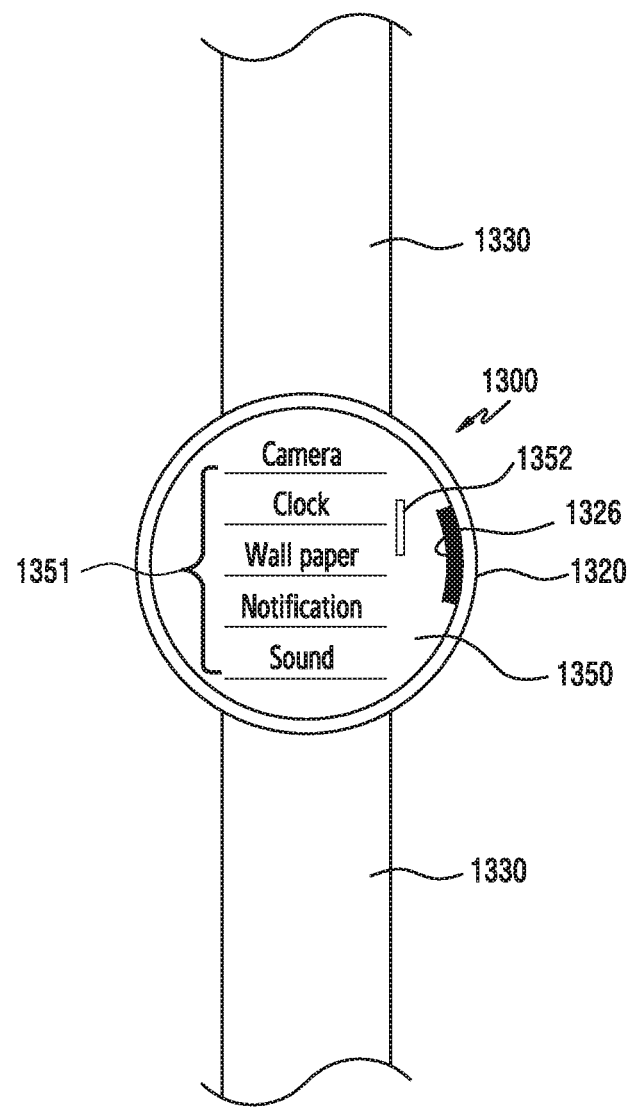

FIGS. 13A and 13B are views each illustrating the state of an electronic device 1300 when a predetermined time has passed after the rotation of a rotating body 1320 according to various embodiments of the present disclosure.

Referring to FIG. 13A, the electronic device 1300 may include a rotating member 1320 rotatably installed in the main body, and may include a connecting portion 1330 that allows the electronic device 1300 to be worn on the user's wrist. According to one embodiment, the electronic device 1300 may display an indicator object 1326 on the display 1325 that may indicate a position along with the rotation of the rotating body 1320.

Referring to FIG. 13B, when the rotating body 1320 rotates clockwise, the corresponding indicator object 1326 displayed on the display 1350 may also be displayed by moving at the same rotating angle, rotation amount, and rotating speed as the rotating body 1320. When the indicator object 1326 is moved to and displayed at the position illustrated in FIG. 13B according to the rotation of the rotating body 1320, various scrollable items 1351 may be scrolled with the scroll bar 1352. According to one embodiment, the items 1351 and the scroll bar 1352 may be moved up or down according to the rotation of the rotating body 1320. According to one embodiment, when the rotating operation of the rotating body 1320 is stopped for a predetermined time, the electronic device 1300 may move the indicator object 1326 to a default state and may display the same, as in the case of FIG. 13A. At the same time, the electronic device 1300 may perform a control such that the display 1350 displays an initial screen before the rotating body 1320 is rotated.

Figure 14:
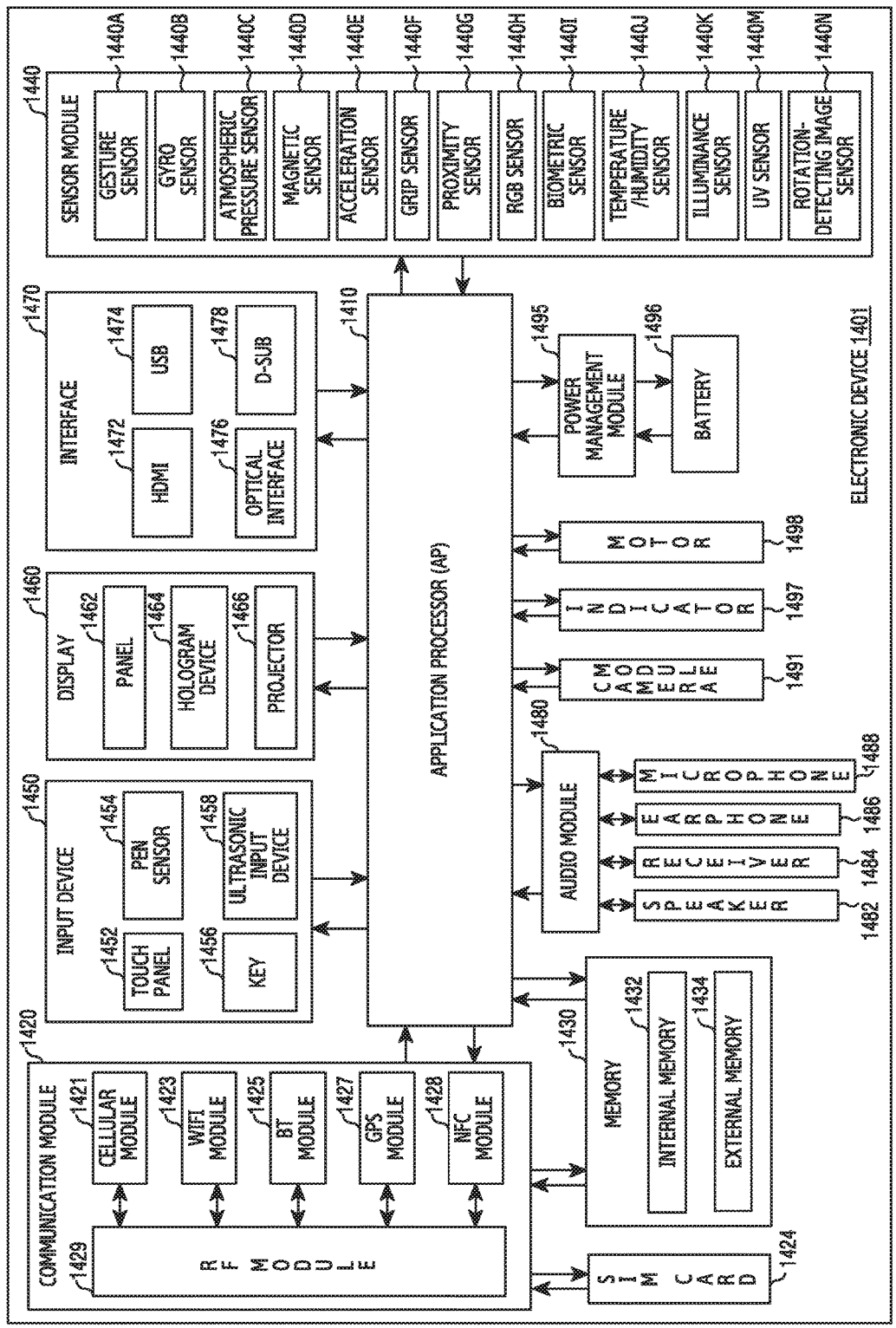
FIG. 14 is a block diagram of an electronic device according to various embodiments of the present disclosure.

FIG. 14 is a block diagram of an electronic device according to various embodiments of the present disclosure.

Referring to FIG. 14, the electronic device 1401 may include, for example, the entirety or a portion of the electronic device 101 illustrated in FIG. 1. Referring to FIG. 14, the electronic device 1401 may include at least one Application Processor (AP) 1410, a communication module 1420, a Subscriber Identification Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may drive an operating system or an application program so as to control a plurality of hardware or software components connected thereto, and may also perform various data processing and arithmetic operations. The AP 1410 may be implemented using, for example, a System-on-Chip (SoC). According to one embodiment, the AP 1410 may further include a Graphic Processing Unit (GPU) (not illustrated).

The communication module 1420 (e.g., the communication interface 160) may perform data transmission/reception between different electronic devices (e.g., the electronic device 104 and the server 106) that are connected to the electronic device 1401 (e.g., the electronic device 101) through a network. According to one embodiment, the communication module 1420 may include a cellular module, 1421, a WiFi module 1423, a BT module 1425, a GPS module 1427, an NFC module 1428, and an RF module 1429.

The cellular module 1421 may provide a voice call service, a video call service, a messaging service, an internet service, or the like through a communication network (e.g., LTE, LTE-A, CDMA, WCDMA, UMTS, WiBro, or GSM). In addition, the cellular module 1421 may perform discrimination and authentication of the electronic device within the communication network by using a subscriber identification module (e.g., the SIM card 1424). According to one embodiment, the cellular module 1421 may perform at least some of the functions that may be provided by the AP 1410. For example, the cellular module 1421 may perform at least a portion of a multimedia control function.

According to one embodiment, the cellular module 1421 may include a Communication Processor (CP). In addition, the cellular module 1421 may be implemented using, for example, an SoC. FIG. 14 illustrates the components, such as the cellular module 1421 (e.g., a communication processor), the memory 1430, and the power management module 1495 as the components that are separated from the AP 1410. According to one embodiment, the AP 1410 may be implemented as at least some of the above-mentioned components (e.g., the cellular module 1421).

According to one embodiment, the AP 1410 or the cellular module 1421 (e.g., a communication processor) may process load commands or data that are received from a non-volatile memory that is connected to each of them or at least one of other components, by loading the commands or data into a volatile memory. In addition, the AP 1410 or the cellular module 1421 may store data, which are received from or generated by at least one of the other components, in the non-volatile memory.

Each of the WiFi module 1423, the BT module 1425, the GPS module 1427, and the NFC module 1428 may include, for example, a processor to process data transmitted/received through a corresponding module. FIG. 14 illustrates the cellular module 1421, the WiFi module 1423, the BT module 1425, the GPS module 1427, and the NFC module 1428 in separate blocks. According to one embodiment, at least some (e.g., two or more) of the cellular module 1421, the WiFi module 1423, the BT module 1425, the GPS module 1427, and the NFC module 1428 may be incorporated in a single Integrated Chip (IC) or an IC package. For example, at least some of the processors, which respectively correspond to the cellular module 1421, the WiFi module 1423, the BT module 1425, the GPS module 1427, and the NFC module 1428 (e.g., a communication processor that corresponds to the cellular module 1421 and a WiFi processor that corresponds to the WiFi module 1423), may be implemented using a single SoC.

The RF module 1429 may perform data transmission/reception (e.g., transmission/reception of an RF signal). The RF module 1429 may include, for example, a transceiver, a Power Amp Module (PAM), a frequency filter, or a Low-Noise Amplifier (LNA). The RF module 1429 may further include a component for transmission/reception of RF waves in free space in wireless communication (e.g., a conductor or a conducting line). FIG. 14 illustrates that the cellular module 1421, the WiFi module 1423, the BT module 1425, the GPS module 1427, and the NFC module 1428 share a single RF module 1429. According to one embodiment, at least one of the cellular module 1421, the WiFi module 1423, the BT module 1425, the GPS module 1427, and the NFC module 1428 may transmit/receive an RF signal through one or more separate RF modules.

The SIM card 1424 may be a card that includes a subscriber identification module, and may be inserted into a slot that is formed at a specific position of the electronic device. The SIM card 1424 may include unique identification information (e.g., Integrated Circuit Card Identifier (ICCID) or subscriber information (e.g., International Mobile Subscriber Identity (IMSI)).

The memory 1430 (e.g., the above-described memory 130) may include an internal memory 1432 or an external memory 1434. The internal memory 1432 may include at least one of, for example, a volatile memory (e.g., Dynamic RAM (DRAM), a Static RAM (SRAM), or a Synchronous DRAM (SDRAM)), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, or a NOR flash memory), a hard drive, or a Solid State Drive (SSD)).

According to one embodiment, the internal memory 1432 may be a Solid State Drive (SSD). The external memory 1434 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1434 may be functionally connected to the electronic device 1401 through various interfaces. According to one embodiment, the electronic device 1401 may further include a storage device (or a storage medium), such as a hard drive.

The sensor module 1440 may measure a physical quantity or may sense an operating status of the electronic device 1401, and may then convert the measured or sensed information into electric signals. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., RGB (Red, Green, Blue) sensor), a biometric sensor 1440I, a temperature/humidity sensor 1440J, an illuminance sensor 1440K, a Ultra-Violet (UV) sensor 1440M, and a rotation detecting image sensor 1440N. The rotation detecting image sensor may detect a detection target disposed on a rotating body that is rotatably provided on the main body of the electronic device. Additionally or alternatively, the sensor module 1440 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an Infra-Red (IR) sensor (not illustrated), an iris sensor (not illustrated), and/or a fingerprint sensor (not illustrated). The sensor module 1440 may further include a control circuit for controlling one or more sensors incorporated therein.

The input device 1450 may include a touch panel 1452, a (digital) pen sensor 1454, a key 1456, or an ultrasonic input device 1458. The touch panel 1452 may recognize a touch input through at least one of, for example, a capacitive type, a resistive type, an infrared type, and an ultrasonic type. Also, the touch panel 1452 may further include a control circuit. The capacitive type may recognize a physical contact or proximity. The touch panel 1452 may further include a tactile layer. In such a case, the touch panel 1452 may provide a tactile reaction to the user.

The (digital) pen sensor 1454 may be implemented by using, for example, a method that is equal or similar to receiving a user's touch input or a separate recognition sheet. The key 1456 may include, for example, a physical button, an optical key, or a keypad. The ultrasonic input device 1458 is a device that is capable of confirming data by sensing sound waves using a microphone (e.g., the mic 1488) in the electronic device 1401 through an input tool that generates an ultrasonic signal. The ultrasonic input device 1458 may perform wireless recognition. According to one embodiment, the electronic device 1401 may receive a user input from an external device (e.g., a computer or a server) that is connected thereto by using the communication module 1420.

The display 1460 (e.g., the above-mentioned display 150) may include a panel 1462, a hologram device 1464, or a projector 1466. The panel 1462 may be, for example, a Liquid Crystal Display (LCD), or an Active-Matrix Organic Light-emitting Diode (AM-OLED). The panel 1462 may be implemented to be, for example, flexible, transparent, or wearable. The panel 1462 may be configured as a single module with the touch panel 1452. The hologram device 1464 may show a stereoscopic image in the air using the interference of light. The projector 1466 may project light onto a screen so as to display an image. The screen may be located, for example, inside or outside the electronic device 1401. According to one embodiment, the display 1460 may further include a control circuit in order to control the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. The interface 1470 may be included in, for example, the communication interface 160 illustrated in FIG. 1. Additionally or alternatively, the interface 1470 may include, for example, a Mobile High-definition Link (MHL) interface, a Secure Digital (SD) card/Multi-Media Card (MMC) interface, or an Infrared Data Association (IrDA) standard interface.

The audio module 1480 may bi-directionally convert sound and an electric signal. At least some of the components of the audio module 1480 may be included in, for example, the input/output interface 140 illustrated in FIG. 1. The audio module 1480 may process sound information input or output through, for example, a speaker 1482, a receiver 1484, an earphone 1486, or a microphone 1488.

The camera module 1491 is a device that is capable of capturing, for example, a still image and a video image. According to one embodiment, the camera module 1491 may include one or more image sensors (e.g., a front sensor or a rear sensor), a lens (not illustrated), an Image Signal Processor (ISP) (not illustrated), or a flash (e.g., an LED or xenon lamp) (not illustrated).

The power management module 1495 may manage the electric power of the electronic device 1401. Although not illustrated, the power management module 1495 may include a Power Management Integrated Circuit (PMIC), a charger Integrated Circuit (IC), or a battery or fuel gauge.

The PMIC may be provided inside, for example, an integrated circuit or an SoC semiconductor. The charging type may be classified into a wired type and a wireless type. The charge IC may charge the battery, and may prevent the inflow of overvoltage or overcurrent. According to one embodiment, the charge IC may include a charge IC for at least one of the wired charge type and the wireless charge type. The wireless charge type may include, for example, a magnetic resonance type, a magnetic-induction type, or an electromagnetic-wave type, and may further include an additional circuit for wireless charging, such as a coil loop, a resonance circuit, or a rectifier.

The battery gauge may measure the residual capacity of the battery 1496, and a voltage, a current, or a temperature during the charge. The battery 1496 may store or generate electricity, and may supply power to the electronic device 1401 using the stored or generated electricity. The battery 1496 may include, for example, a rechargeable battery or a solar battery.

The indicator 1497 may indicate a specific status of the electronic device 1401 or a part thereof (e.g., AP 1410), such as a booting status, a message status, or a charged status. The motor 1498 may convert an electric signal into a mechanical vibration. Although not illustrated, the electronic device 1401 may include a processor (e.g., GPU) in order to support a mobile TV. The processor to support a mobile TV may process media data according to the standards of, for example, Digital Multimedia Broadcasting (DMB), Digital Video Broadcasting (DVB), or media flow.

The above described components of the electronic device according to various embodiments of the present disclosure may be formed of one or more components, and a name of a corresponding component element may be changed based on the type of electronic device. In various embodiments of the present disclosure, the electronic device may include at least one of the above-described elements, and may exclude some of the elements or further include other additional elements. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present disclosure may be implemented as, for example, instructions stored computer readable storage media in the form of programming modules. When the command is executed by one or more processors (for example, the processor 1410), the one or more processors may execute a function corresponding to the command. The computer-readable storage medium may be, for example, the memory 1430. At least a part of the programming module may, for example, be implemented (e.g., executed) by the processor 210. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. An electronic device comprising:
    a main body that includes at least one electronic component, the at least one electronic component including at least one camera sensor;
    a rotating body that is rotatable on the main body and encloses at least a region of the main body;
    a rotation-detecting member configured to detect a rotation parameter of the rotating body; and
    at least one processor configured to cause the electronic device to perform a first function based on the detected rotation parameter,
    wherein the rotating body includes a functional window located on an outer circumferential face of the rotating body such that the functional window can be rotated to a position corresponding to the at least one camera sensor,
    wherein the at least one camera sensor is disposed in a manner of being exposed to the outer circumferential face of the main body and performs an imaging function through the functional window, and
    wherein the functional window is transparent or translucent.

2. The electronic device of claim 1, wherein the at least one processor is further configured to cause a first function of the at least one camera sensor corresponding to the functional window to be automatically performed based on the detected rotation parameter of the rotating body.

3. The electronic device of claim 2, wherein the at least one electronic component further includes at least one of a fingerprint recognition sensor, an illuminance sensor, a proximity sensor, a heart rate measuring sensor, or an infrared sensor.

4. The electronic device of claim 1, further comprising:
    an engagement member that is provided on the outer circumferential face of the main body such that the engagement member is temporarily engaged with a plurality of engagement recesses that are successively formed along an inner circumferential face of the rotating body so as to retain a rotated position of the rotating body and to provide a rotating sensation to a user.

5. The electronic device of claim 1, wherein the rotation-detecting member is an image sensor that is disposed in the main body and detects a sanding pattern formed along an inner circumferential face of the rotating body.

6. The electronic device of claim 1, wherein the detected rotation parameter includes at least one of a rotation amount, a rotating speed, a rotating direction, or a rotated position of the rotating body.

7. The electronic device of claim 6, wherein the at least one processor is further configured to cause the electronic device to perform a corresponding function based on rotated position information of the rotating body.

8. The electronic device of claim 1, wherein the electronic device is a watch-type wearable electronic device, and the rotating body is a bezel-type electronic device disposed in a manner of enclosing a display of the electronic device.

9. The electronic device of claim 1, wherein the electronic device is a bar-type electronic device including a display, and the rotating body is disposed on at least a region of the display or a region other than the display.

10. The electronic device of claim 9, wherein the rotating body further includes a sub-display separate from the display.

11. The electronic device of claim 1, wherein the at least one processor is further configured to cause the display to display a second function that is associated with the first function or a third function that is not associated with the first function according to rotation of the rotating body.

12. The electronic device of claim 1, further comprising:
    an indicator that is disposed on the rotating body in order to cause rotation of the rotating body to be easily recognized.

13. The electronic device of claim 1, wherein the at least one processor is further configured to return to the first function or a previous function when rotation of the rotating body is not detected after a predetermined time has elapsed after a corresponding function was executed according to rotation of the rotating body.

14. The electronic device of claim 1, wherein the rotation-detecting member further comprises at least one of an image sensor, an infrared ray sensor, or a photo coupler which detects an optical detection target located on an inner circumferential surface of the rotating body.

* * * * *